Nov. 5, 1968   G. DYKEMAN   3,409,774
METHOD OF DETERMINING THE THICKNESS OF A COATING ON A METAL BASE
AND METHOD OF CALIBRATING THE THICKNESS GAUGE
Filed May 25, 1966
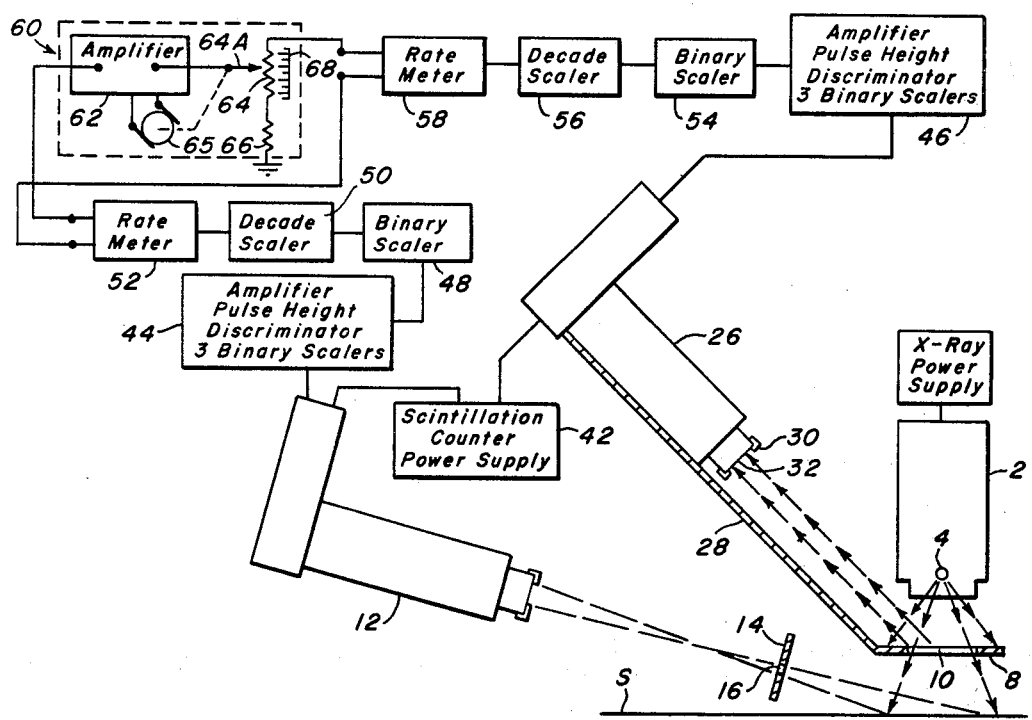
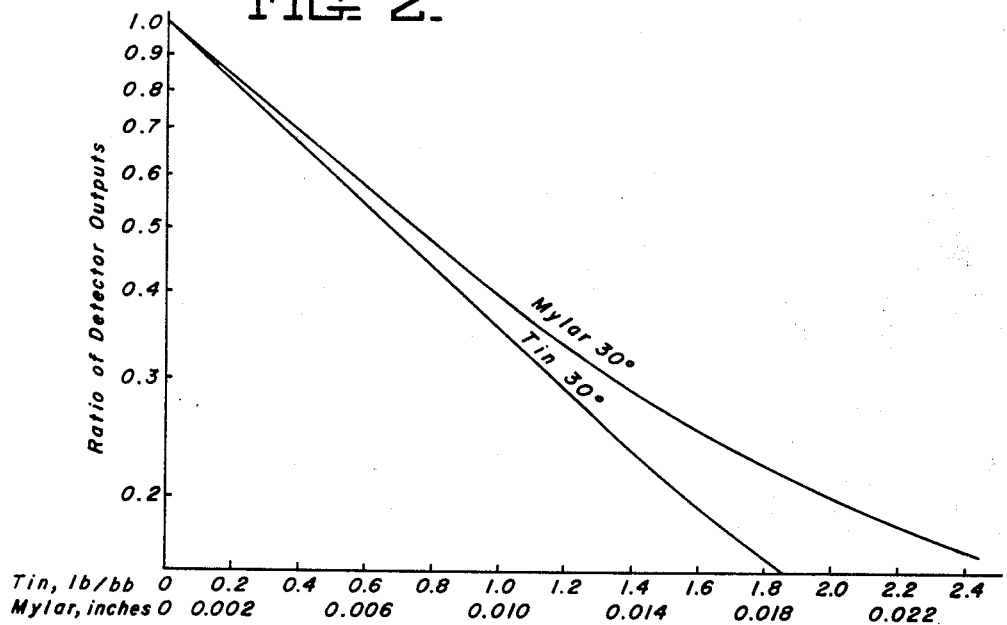
INVENTOR.
GEORGE DYKEMAN
By Donald G. Dalton
Attorney

United States Patent Office 3,409,774
Patented Nov. 5, 1968

3,409,774
METHOD OF DETERMINING THE THICKNESS OF A COATING ON A METAL BASE AND METHOD OF CALIBRATING THE THICKNESS GAUGE
George Dykeman, Dormont Borough, Pa., assignor to United States Steel Corporation, a corporation of Delaware
Continuation-in-part of application Ser. No. 307,853, Sept. 10, 1963. This application May 25, 1966, Ser. No. 574,484
10 Claims. (Cl. 250—83.3)

This application, which is a continuation-in-part of my co-pending application, Ser. No. 307,853, filed Sept. 10, 1963 now abandoned, relates to a method of determining the thickness of a coating on a metal base and more particularly to determining the thickness of a tin or zinc coating on a ferrous base. Methods and apparatus for determining tin coating thickness are disclosed in Beegley Patent No. 2,521,772 dated Sept. 12, 1950; Webster Patent No. 2,763,784 dated Sept. 18, 1956; McCartney et al. Patent No. 2,578,722 dated Dec. 18, 1951 and Pellesier Patent No. 3,012,140 dated Dec. 5, 1961. As disclosed in these patents X-ray are used to cause secondary radiation in the base material and the radiation detector measures the amount of iron secondary radiation that passes through the coating material. The thickness of the coating determines the amount of secondary radiation absorbed. According to the patents, the thickness of the tin coating is determined either by comparing the amount of secondary radiation detected with samples having known coating thicknesses or by calibrating the gauge by determining the reading on the counter for known thicknesses of tin coatings. Regardless of which method is used the coating thickness must be determined by chemical methods to determine the quantity of tin per unit area of steel surface. Irregular coating distribution, roughness or irregularity of the base material, or alloying of the tin and the iron may cause considerable variation between the actual coating thickness of the sample and the average coating thickness as determined by the chemical method. The comparison samples are difficult to preserve for extended periods of time under constant use and are subject to the same type of variations and irregularities that are the reasons for gauging the unknown samples.

Other methods of utilizing X-ray gauges to determine the thickness of a coating on a base material of a different material include the use of primary X-ray beams having sufficient energy to excite both the base metal and the coating, with the energies from the materials being separated from each other and increases in coating thickness resulting in an increase in the intensity of the characteristic re-radiation of the coating material, and the use of a primary X-ray beam having sufficient energy to excite the coating material but not enough to excite the base material, with increases in coating thickness resulting in increases in the intensity of the secondary radiation. Each of these methods requires calibration in a manner similar to that described above in reference to the first method of X-ray gauging.

Similar gauges are used for determining thicknesses of other types of coatings. X-ray or gamma-ray gauges, in addition to being used for determining tin coating thickness, are used to determine the thickness of other thick coatings. Beta ray or electron beam gauges are used to determine the thickness of medium weight coatings such as zinc on steel. For example, when determining zinc coating thickness the beta rays are reflected back from the ferrous base and the intensity of the reflected beam is measured. Alpha-ray or ion gauges are used to determine the thickness of light weight coatings such as plastics. Since my invention is not limited to any particular type of gauge, but is directed primarily to the manner of calibrating the gauge, the term "primary energy beam" will be used to identify any source of primary beam and the term "energy beam produced and returned from said base metal" will be used to identify the beam being measured to determine thickness.

It is therefore an object of my invention to provide a method of calibrating a coating thickness gauge in which it is not necessary to use a comparison sample for the material being gauged.

Another object is to provide a method of determining the thickness of coating on a base without the need of comparing with a sample of the same material.

These and other objects will be more apparent after referring to the following specification and attached drawings, in which:

FIGURE 1 is a schematic view of a tin coating gauge or detector which may be utilized in the practice of my invention; and FIGURE 2 is a chart showing the relationship between the detector outputs for tin and Mylar coatings on a ferrous base.

Referring more particularly to the drawings, the invention will be described with reference to the gauge shown in the above mentioned Pellesier et al. patent when determining the thickness of a tin coating on an iron base. As shown in FIGURE 1 the reference numeral 2 indicates an X-ray tube having a tungsten target 4 from which X-rays radiate. A diaphragm 8 is arranged beneath the tube 2 generally normal to the axis of the tube and has an opening 10 therethrough. The diaphragm 8 is preferably made of the same material as that of the strip S being gauged. A radiation counter 12 is arranged above the path of travel of the strip S at an angle thereto. A baffle 14 made of steel or other material capable of stopping X-rays is provided between the radiation counter 12 and the strip beneath the X-ray tube 2. A slit 16 in the baffle 14 permits passage of and limits the line of sight of X-rays to the radiation counter 12. A secondary radiation counter 26, similar to radiation counter 12, is mounted on a shield 28 which may be an extension of diaphragm 8. Shielding 30 may be placed around aperture 32 of radiation counter 26 to adjust the amount of radiation viewed by it at a given time. Power for the radiation counters 12 and 26 is provided from a power supply 42. The output of radiation counter 12 is fed to a unit 44 which consists of an amplifier, a pulse height discriminator and three binary scalers in series. This is a commercial unit available from various sources including Phillips Electronics, Inc. as shown in their catalog 42234. A similar unit 46 is connected to the radiation counter 26. The output of unit 44 is fed through a binary scaler 48 to a decade scaler 50 and then to a rate meter 52. The output of the unit 46 is fed through a similar binary scaler 54 and a similar decade scaler 56 to a similar rate meter 58. The outputs of meters 52 and 58 are fed to a ratio recorder 60. The ratio recorder 60 is a standard potentiometer recorder modified so that its chart will give a reading corresponding to a ratio of the signals from rate meters 52 and 58. The recorder 60 consists generally of an amplifier 62 connected to meter 52, a slide wire resistor 64 having its arm 64A electrically connected to the amplifier 62 and mechanically connected to a motor 65 which is electrically connected to amplifier 62. The motor 65 also drives the pen (not shown) associated with the recorder chart. A resistor 66 is connected in series with slide wire resistor 64. The slide wire resistor 64 is connected to meter 58 instead of the standard battery used in a standard potentiometer recorder. Other standard equipment may be used for determining the ratio between the outputs of radiation counters 12 and 26.

The operation of the gauge is as follows:

As the strip S passes beneath the X-ray tube 2 the X-rays from the tube 2 pass through the opening 10 to the strip S and through the tin coating to the steel base. The fluorescent radiation from the steel base passes through the tin coating with a portion thereof passing through the slit 16 to the radiation counter 12. At the same time a portion of the X-rays strikes the diaphragm 8 and the fluorescent radiation therefrom passes upwardly through the slot 32 to the radiation counter 26. The outputs of the radiation counters 12 and 26 are fed to the ratio recorder 60 and the ratio obtained. The signals from meters 52 and 58 are in the form of voltages with the voltage from meter 52 being fed to amplifier 62 where it is compared with the voltage at the arm 64A which last voltage is a function of the voltage from meter 58. If the voltage from the two meters 52 and 58 do not balance the amplifier 62 provides a signal to motor 65 causing it to move arm 64A until the voltages do balance. When measuring the thickness of a tin coating on steel the value of resistor 66 is chosen so that the value on scale 68 adjacent resistor 66 will indicate the thickness of the heaviest coating to be measured and the value at the opposite end will indicate the lightest coating to be measured.

According to my invention, when measuring tin coating thickness, the X-ray tube 2 is operated at a fixed voltage between 7 and 29 kilovolts, for example 10.7 kilovolts, and the overall operation of the gauge adjusted. A ferrous base, which is preferably a piece of the strip to be coated with tin, is provided. This has a flat surface. A plurality of sheets of material having similar absorption characteristics as the coating material, but which is considerably less dense than the coating material are provided. I have found that polyethylene terephthalate which is sold under the trade name Mylar by Dupont is suitable for this purpose. The relationship between the detector outputs for tin and Mylar coatings for a detection angle of 30° is shown in FIGURE 2. Each sheet of Mylar must be of uniform thickness throughout. A sheet or sheets of Mylar is then placed on the ferrous base under the X-ray tube 2 and the reading on resistor 64 recorded. A similar reading is taken with a second thickness of Mylar and also recorded. This is continued until sufficient readings are taken to cover the range of thicknesses of tin coatings. For example when the X-ray tube 2 is operated at 14 kilovolts and the detector is a scintallation counter with a thin nickel filter 1,000 microinches of Mylar is exactly equivalent to 5.5 microinches of tin and 10,000 microinches of Mylar is equivalent to 55 microinches of tin. Thus there is a linear relationship between Mylar and tin for those thicknesses of coatings which are in the normal range of tin coating thicknesses. Since the Mylar is produced in smooth sheets the roughness of the base metal will not affect the X-ray measurement and since the Mylar is separate from the base metal it can be tested and evaluated for thickness variation, density, imperfections and other irregularities before and after it is employed as a reference or comparison sample. After the readings for the various thicknesses of Mylar are obtained samples of tin plate having various weights of tin may be placed in the gauge and the readings on resistor 64 recorded. The weight of the tin on the samples are then checked by the AISI referee method to determine the apparent thickness for each reading on the gauge. Since the relationship between the thickness of Mylar and the tin coating has previously been determined this last mentioned step need not be performed except when desired as a further check. The scale 68 is calibrated to read in tin coating thickness. When obtaining the thickness of an unknown tin coating the material being gauged is passed under the X-ray gauge 2 and the thickness can be read directly from scale 68. Thus it is not necessary to compare the reading from a sample having an unknown thickness of tin and the reading from a sample or samples having a known thickness. It should also be noted that my method determines the thickness of the tin including the alloy layer as compared to the determination of the weight of the tin coating. This method may also be used with a device such as shown in the Beegley or Webster patents by directly comparing the reading of a known thickness of Mylar with the reading from an unknown thickness of the tin coating.

I have described my invention specifically as it relates to determining the coating thickness of tin on steel with an X-ray gauge when using Mylar as the calibrating material, but it will be understood that other types of gauges and calibrating materials may be used. For example, a granulated coating material such as zinc may be uniformly dispersed in a plastic binder to produce a rigid, uniform reference sample for calibrating or the zinc may be combined in a homogenous alloy mixture with a second material of low atomic number such as aluminum whose secondary radiation is not detectable by the radiation detectors and the resulting alloy rolled into thin sheets which are used as reference samples. The various types of gauges need not vary much from that shown in FIGURE 1. The main basic differences relate to the selection of a suitable source of primary energy beam and a suitable counter or detector 12. It is also contemplated that a very thin sheet of material other than the calibrating material, may be placed on top of the calibrating material. This may be advisable in order to protect the calibrating material or for other purposes.

While several embodiments of my invention have been shown and described it will be apparent that other adaptations and modifications may be made without departing from the scope of the following claims.

I claim:

1. The method of calibrating a gauge for determining the thickness of a coating on a metal base which gauge has means for directing a primary energy beam against the coated metal and means for measuring the intensity of the energy beam produced and returned from said base metal through said coating; which method comprises providing a sample of the base metal having a flat surface, providing a plurality of sheets of a material having absorption characteristics similar to and of known relationship to those of the coating material but which is considerably less dense than the coating material, placing known thicknesses of said sheets of material on said flat surface, directing an energy beam of fixed and known characteristics against said flat surface, measuring for each known thickness of said material the intensity of the resultant energy beam produced and returned from said flat surface through said material, and calibrating the intensity measuring means from said measurements so as to obtain coating thickness readings.

2. The method of claim 1 in which the base metal is steel, the coating is tin, the primary energy beam is X-rays, and the measured beam is secondary radiation from said ferrous base.

3. The method of claim 1 in which the sheets of material are polyethylene terephthalate.

4. The method of claim 3 in which the base metal is steel, the coating is tin, the directed energy beam is X-rays, and the measured beam is secondary radiation from said ferrous base.

5. The method of claim 1 in which the base metal is steel, the coating is zinc, the directed energy beam is beta rays, the measured beam is reflected beta rays, and the sheets of material are polyethylene terephthalate.

6. The method of determining the thickness of a coating on a metal base which comprises providing a flat base of the same metal as the coating base, providing a plurality of sheets of a material having absorption characteristics similar to and of known relationship to those of the coating material but which is considerably less dense than the coating material, placing known thickness of said sheets of material on said flat base, directing a primary beam of fixed and known characteristics against said flat base, measuring for each known thickness of said sheet material the intensity of the resultant energy beam produced and returned from said flat base through said sheet material, directing a primary beam under the same conditions against a coated base, and measuring the intensity of the energy beam produced and returned from said base metal through said coating, whereby the thickness of the coating is determined by comparison with the readings obtained when using the said material.

7. The method of claim 6 in which the base metal is steel, the coating is tin, the primary energy beam is primary X-rays from a tungsten target at a fixed voltage between 7 and 29 kilovolts, and the measured beam is secondary radiation from said ferrous base.

8. The method of claim 6 in which the sheets of material are polyethylene terephthalate.

9. The method of claim 8 in which the base metal is steel, the coating is tin, the directed energy beam is primary X-rays from a tungsten target at a fixed voltage between 7 and 29 kilovolts, and the measured beam is secondary radiation from said ferrous base.

10. The method of claim 6 in which the base metal is steel, the coating is zinc, the directed energy beam is beta rays, the measured beam is reflected beta rays, and the sheets of material are polyethylene terephthalate.

References Cited

UNITED STATES PATENTS

| | | | |
|---|---|---|---|
| 3,012,140 | 12/1961 | Pellissier et al. | 250—83.3 |
| 3,056,026 | 9/1962 | Bigelow | 250—83.3 |
| 3,236,090 | 2/1966 | Neal | 250—83 |

RALPH G. NILSON, *Primary Examiner.*

A. L. BIRCH, *Assistant Examiner.*